United States Patent

Hackl et al.

[11] Patent Number: 5,837,760
[45] Date of Patent: Nov. 17, 1998

[54] SELF-EXTINGUISHING THERMOPLASTIC POLYURETHANES AND THEIR PREPARATION

[75] Inventors: Christa Hackl, Bad Essen; Friedhelm Lehrich, Lemfoerde; Gerhard Bittner, Diepholz, all of Germany

[73] Assignee: Elastogran GmbH, Germany

[21] Appl. No.: 897,183

[22] Filed: Jul. 21, 1997

Related U.S. Application Data

[63] Continuation of Ser. No. 651,124, May 21, 1996, abandoned, which is a continuation of Ser. No. 213,660, Mar. 16, 1994, abandoned.

[51] Int. Cl.⁶ .................................................. C08K 5/523
[52] U.S. Cl. ........................ 524/127; 524/101; 524/125
[58] Field of Search .................................. 524/125, 127, 524/101; 521/107, 108

[56] References Cited

U.S. PATENT DOCUMENTS

| | | | |
|---|---|---|---|
| 3,100,752 | 8/1963 | Dombrow | 521/145 |
| 3,134,742 | 5/1964 | Wismer et al. | |
| 3,385,801 | 5/1968 | Birum et al. | 521/107 |
| 3,509,076 | 4/1970 | Anderson | 521/108 |
| 3,547,842 | 12/1970 | Bright et al. | 521/108 |
| 3,600,339 | 8/1971 | Baranauckas et al. | 521/108 |
| 3,787,528 | 1/1974 | Benghiat | 524/139 |
| 3,966,849 | 6/1976 | Noetzel et al. | 524/117 |
| 3,991,019 | 11/1976 | Shim | 524/117 |
| 4,002,580 | 1/1977 | Russo | 524/117 |
| 4,035,448 | 7/1977 | Mayerhoefer et al. | 524/117 |
| 4,067,931 | 1/1978 | Batorewicz | 524/117 |
| 4,070,336 | 1/1978 | Birum | 524/117 |
| 4,085,283 | 4/1978 | Den Otter et al. | 524/101 |
| 4,139,501 | 2/1979 | Rudner et al. | |
| 4,197,373 | 4/1980 | Miano et al. | |
| 4,203,888 | 5/1980 | Rasgbrook | 524/127 |
| 4,221,875 | 9/1980 | Yukuta et al. | |
| 4,228,063 | 10/1980 | Granzow | 524/117 |
| 4,255,324 | 3/1981 | Granzow et al. | 524/117 |
| 4,258,141 | 3/1981 | Jarre et al. | |
| 4,293,657 | 10/1981 | Nissen et al. | |
| 4,317,889 | 3/1982 | Peolinsky, Jr. | |
| 4,374,207 | 2/1983 | Stone et al. | |
| 4,407,981 | 10/1983 | Aaronson | |
| 4,757,093 | 7/1988 | Ricciardi et al. | |
| 5,135,973 | 8/1992 | Fukasawa et al. | 524/127 |

FOREIGN PATENT DOCUMENTS

| | | |
|---|---|---|
| A-0134455 | 3/1985 | European Pat. Off. |
| A-0170206 | 2/1986 | European Pat. Off. |
| A-0316736 | 5/1989 | European Pat. Off. |
| A-352528 | 1/1990 | European Pat. Off. |
| A-389768 | 10/1990 | European Pat. Off. |
| A-2901774 | 7/1980 | Germany |
| A-4005373 | 8/1991 | Germany |
| 4040276 | 6/1992 | Germany |
| 54-85242 | 7/1954 | Japan |
| 59-24736 | 2/1984 | Japan |
| 59-45351 | 3/1984 | Japan |
| 59-2240 | 11/1984 | Japan |
| 60-63251 | 4/1985 | Japan |
| 51-70996 | 7/1993 | Japan |

OTHER PUBLICATIONS

*Developments in Polyurethane—1*, J. M. Buist editor, pp. 68–70, 137 1974.
Derwent Abstract of JP–075629, 1981.
Derwent Reference 60774B/33 for JP–56–000817.
Derwent Reference 16535D/10 for JP–54–085242.
Derwent Reference—JP 065629; 1981.
Derwent Reference—JP 152950.
EPX Search Report Dated Nov. 11, 1994; translation of EPX Search Report.

*Primary Examiner*—Veronica P. Hoke
*Attorney, Agent, or Firm*—James J. Drake

[57] ABSTRACT

Self-extinguishing thermoplastic polyurethanes contain, as flameproofing agents, one or more organic phosphates and/or one or more organic phosphonates, preferably as a mixture together with melamine derivatives.

16 Claims, No Drawings ent
SELF-EXTINGUISHING THERMOPLASTIC POLYURETHANES AND THEIR PREPARATION

This is a continuation of prior application Ser. No. 08/651,124, filed May 21, 1996, now abandoned, which is a continuation of application, Ser. No. 08/213,660, filed Mar. 16, 1994 now abandoned.

The present invention relates to self-extinguishing thermoplastic polyurethanes containing at least one flameproofing agent and, if required, further conventional additives and/or assistants, and a process for their preparation by reacting a) organic and/or modified organic diisocyanates with b) relatively high molecular weight, essentially difunctional polyhydroxy compounds and, if required, c) difunctional chain extenders, in the presence of d) at least one flameproofing agent, e) at least one catalyst and, if required, f) further assistants and/or additives.

The preparation of thermoplastic polyurethanes (TPU) is known and is described in many patent and literature publications.

An example is Kunststoff-Handbuch, Volume VII, Polyurethane, Carl-Hanser-Verlag, Munich, 1st Edition, 1966, Editors Dr. R. Vieweg and Dr. A. Höchtlen, and 2nd Edition, 1983, Editor Dr. G. Oertel.

The conventional, in particular difunctional components can be used for the preparation of TPU. Examples are relatively high molecular weight polyhdyroxy compounds, which form the flexible phase, for example polyoxyalkylene glycols, such as polyoxypropylene glycols, polyoxyethylene glycols, polyoxypropylene polyoxyethylene glycols, polyoxybutylene glycols, polyoxybutylene polyoxyethylene glycols or polyoxybutylene polyoxypropylene glycols, or polyesterdiols, such as alkanediol polyadipates; aromatic or aliphatic diisocyanates, eg. diphenylmethane 4,4'-diisocyanate (MDI) or hexamethylene 1,6-diisocyanate (HDI), and low molecular weight chain extenders for the formation of the rigid segments, for example alkanediols or dialkylene glycols, such as 1,4-butanediol or diethylene glycol.

A disadvantage of the TPUs is their high flammability. In order to reduce this disadvantage, flameproofing agents, in particular halogen-containing compounds, are incorporated in the TPUs. However, the addition of these products often has an adverse effect on the mechanical properties of the resulting TPU molding materials. Furthermore, owing to the corrosive effect of the halogen-containing substances, halogen-free self-extinguishing TPU molding materials are desirable.

The use of melamine or melamine derivatives as flameproofing agents for flameproofing polyurethane foams has already been proposed (cf. inter alia U.S. Pat. No. 4,221,875, U.S. Pat. No. 4,258,141, U.S. Pat. No. 4,293,657, JP-A-79/75 629, DE-A-40 05 373, EP-A-389 768 and EP-A-352 528).

JP-A-79/85 242 discusses the use of melamine cyanurate as a flameproofing agent, inter alia for TPU.

In addition, a large number of halogen-free compounds, for example various phosphorus compounds, have been proposed for flameproofing thermoplastic polymers, for example polystyrene or polyolefins. The use of many of these prior art halogen-free flameproofing agents in TPU results in the heat stability of the TPU during processing being insufficient and decomposition phenomena occurring, with the result that there is a sharp deterioration in the mechanical properties of the TPU.

It is an object of the present invention to provide self-extinguishing thermoplastic polyurethanes which contain no halogen-containing flameproofing agents, extinguish in a few seconds without combustion after ignition with a hot flame and do not drip particles or flaming particles and at the same time have good mechanical and processing properties.

We have found that this object is achieved, according to the invention, if organic phosphates and/or organic phosphonates, as such or in particular as a mixture with melamine derivatives, are used for flameproofing the TPUs.

The present invention accordingly relates to self-extinguishing thermoplastic polyurethanes which contain at least one flameproofing agent and, if required, further conventional additives and/or assistants, wherein at least one organic phosphate and/or at least one organic phosphonate are present as flameproofing agents. In an advantageous embodiment of the invention, the self-extinguishing thermoplastic polyurethanes additionally contain at least one melamine derivative, for example melamine cyanurate, in addition to the organic phosphates and/or organic phosphonates, as flameproofing agents.

The present invention furthermore relates to a process for the preparation of self-extinguishing thermoplastic polyurethanes by reacting a) organic and/or modified organic diisocyanates with b) relatively high molecular weight, in particular essentially difunctional polyhydroxy compounds and, if required, c) chain extenders, in the presence of d) at least one flameproofing agent, e) at least one catalyst and, if required, f) further assistants and/or additives, wherein at least one organic phosphate and/or at least one organic phosphonate or mixtures thereof with melamine derivatives are used as flameproofing agents (d).

For the purposes of the present invention, the thermoplastic polyurethanes are also referred to as TPU for short. These are the conventional, essentially linear, polyurethanes which can be processed by a thermoplastic method.

It was surprising and in no way foreseeable that, by incorporating organic phosphates and/or organic phosphonates into TPU, not only would self-extinguishing molding materials be obtained but the mechanical and important processing properties and performance characteristics of the TPU would not be adversely affected.

All conventional TPUs which can be prepared by the conventional processes are suitable for the flameproofing treatment according to the invention. Particularly advantageous results have been obtained in the the case of the polyester TPUs.

Regarding the novel TPUs and their components a) to f), the following may be stated specifically:

a) Suitable organic and/or modified organic diisocyanates are aliphatic, cycloaliphatic or preferably aromatic diisocyanates. Specific examples are aliphatic diisocyanates, such as hexamethylene 1,6-diisocyanate, 2-methylpentamethylene 1,5-diisocyanate, 2-ethylbutylene 1,4-diisocyanate or mixtures of at least two of the stated aliphatic diisocyanates; cycloaliphatic diisocyanates, such as isophorone diisocyanate, cyclohexane 1,4-diisocyanate, 1-methylcyclohexane 2,4-diisocyanate or 2,6-diisocyanate and the corresponding isomer mixtures, dicyclohexylmethane 4,4'-, 2,4'- and 2,2'-diisocyanate and the corresponding isomer mixtures, and preferably aromatic diisocyanates, such as toluylene 2,4-diisocyanate, mixtures of toluylene 2,4- and 2,6-diisocyanate, diphenylmethane 4,4'-, 2,4'- and 2,2'-diisocyanate, mixtures of diphenylmethane 2,4- and 4,4'-diisocyanate, urethane-modified liquid diphenylmethane 4,4'- and/or 2,4'-diisocyanates, 4,4'-diisocyanato-1,2-diphenylethane, mixtures of 4,4'-, 2,4'- and 2,2'-diisocyanato-1,2-diphenylethane, and advantageously those containing at least 95% by weight of 4,4'-diisocyanato-1,2-diphenylethane, and naphthylene 1,5-diisocyanate. Diphenylmethane diisocyanate isomer mixtures containing more than 96% by weight of diphenylmethane 4,4'-diisocyanate and in particular substantially pure diphenylmethane 4,4'-diisocyanate are preferably used.

The organic diisocyanates may be replaced, if desired in minor amounts, for example in amounts of up to 3, preferably up to 1, mol %, based on the organic diisocyanate, by a polyisocyanate which is trifunctional or has a higher functionality, although the amount thereof must be limited so that polyurethanes which can be processed by a thermoplastic method are still obtained. A larger amount of such isocyanates which have a functionality of more than 2 is advantageously balanced by the presence of compounds which have a functionality of less than 2 and possess reactive hydrogen atoms, so that excessive chemical crosslinking of the polyurethane is avoided. Examples of isocyanates which have a functionality of more than 2 are mixtures of diphenylmethane diisocyanates and polyphenylpolymethylene polyisocyanates, ie. crude MDI, and liquid diphenylmethane 4,4'- and/or 2,4'-diisocyanates modified with isocyanurate, urea, biuret, allophanat, urethane and/or carbodiimide groups.

Examples of suitable monofunctional compounds which have a reactive hydrogen atom and can also be used as molecular weight regulators are monoamines, eg. butyl-, dibutyl-, octyl-, stearyl- and N-methylstearylamine, pyrrolidone, piperidine and cyclohexylamine, and monoalcohols, eg. butanol, amyl alcohol, 1-ethylhexanol, octanol, dodecanol, cyclohexanol and ethylene glycol monoethyl ether.

b) Suitable relatively high molecular weight polyhydroxy compounds having molecular weights of from 500 to 8,000 are polyetherdiols and in particular polyesterdiols. For example, polybutadienediol is used and also gives good results in the preparation of crosslinkable TPU. Other hydroxyl-containing polymers having ether or ester groups in the polymer chain, for example polyacetals, such as polyoxymethylene, and especially water-insoluble formals, for example polybutanediolformal and polyhexanediolformal, and polycarbonates, in particular those obtained from diphenyl carbonate and 1,6-hexanediol and prepared by transesterification, are also suitable. The polyhydroxy compounds should be at least predominantly linear and must be essentially difunctional for the purposes of the isocyanate reaction. The stated polyhydroxy compounds may be used as individual components or in the form of mixtures.

Suitable polyetherdiols can be prepared by known processes, for example by anionic polymerization of alkylene oxides with alkali metal hydroxides, such as sodium hydroxide or potassium hydroxides, or alkali metal alcoholates, such as sodium methylate, sodium ethylate, potassium ethylate or potassium isopropylate, as catalysts and with the addition of at least one initiator which contains 2 or 3, preferably 2, bound reactive hydrogen atoms per molecule, or by cationic polymerization with Lewis acid, such as ammonium pentachloride, boron fluoride etherate, etc., or a bleaching earth as a catalyst, from one or more alkylene oxides where the alkylene radical is of 2 to 4 carbon atoms.

Examples of suitable alkylene oxides are tetrahydrofuran, 1,3-propylene oxide, 1,2- and 2,3-butylene oxide and particularly preferably ethylene oxide and 1,2-propylene oxide. The alkylene oxides may be used individually, alternately in succession or as mixtures. Examples of suitable initiators are water, organic dicarboxylic acids, such as succinic acid, adipic acid and/or glutaric acid, alkanolamines, such as ethanolamine, N-alkylalkanolamines, N-alkyldialkanolamines, such as N-methyldiethanolamine and N-ethyldiethanolamine, and preferably dihydric alcohols which may contain bound ether bridges, eg. ethanediol, 1,2- and 1,3-propanediol, 1,4-butanediol, diethylene glycol, 1,5-pentanediol, 1,6-hexanediol, dipropylene glycol, 2-methyl-1,5-pentanediol and 2-ethyl-1,4-butanediol. The initiators may be used individually or as mixtures.

Polyetherols obtained from 1,2-propylene oxide and ethylene oxide, in which more than 50%, preferably from 60 to 80%, of the OH groups are primary hydroxyl groups and in which at least some of the ethylene oxide is arranged as the terminal block, are preferably used. Such polyetherols can be obtained, for example, by first polymerizing 1,2-propylene oxide with the initiator, followed by the ethylene oxide, or first copolymerizing the entire 1,2-propylene oxide as a mixture with some of the ethylene oxide and subsequently polymerizing the remainder of the ethylene oxide or gradually polymerizing first some of the ethylene oxide then the total amount of 1,2-propylene oxide and thereafter the remainder of the ethylene oxide with the initiator.

The hydroxyl-containing polymerization products of tetrahydrofuran are also particularly suitable.

The essentially linear polyetherols usually have molecular weights of from 500 to 8,000, preferably from 600 to 6,000, in particular from 800 to 3,500, the polyoxytetramethylene glycols preferably having molecular weights of from 500 to 2,800. They may be used both individually and in the form of mixtures with one another.

Suitable polyesterdiols can be prepared, for example, from dicarboxylic acids of 2 to 12, preferably 4 to 6, carbon atoms and diols. Examples of suitable dicarboxylic acids are aliphatic dicarboxylic acids, such as succinic acid, glutaric acid, adipic acid, suberic acid, azelaic acid and sebacic acid, and aromatic dicarboxylic acids, such as phthalic acid, isophthalic acid and terephthalic acid. The dicarboxylic acids may be used individually or as mixtures, for example in the form of a mixture of succinic, glutaric and adipic acid. For the preparation of the polyesterols, it may be advantageous to use, instead of the dicarboxylic acids, the corresponding dicarboxylic acid derivatives, such as dicarboxylic acid mono- or diesters where the alcohol radical is of 1 to 4 carbon atoms, dicarboxylic anhydrides or dicarboxylic dichlorides. Examples of diols are glycols of 2 to 10, preferably 2 to 6, carbon atoms, such as ethylene glycol, diethylene glycol, 1,4-butanediol, 1,5-pentanediol, 1,6-hexanediol, 1,10-decanediol, 2,2- dimethyl-1,3-propanediol, 1,3-propanediol and dipropylene glycol. Depending on the desired properties the diols may be used alone or, if required, as mixtures with one another.

Esters of carbonic acid with the stated diols, in particular those of 4 to 6 carbon atoms, such as 1,4-butanediol and/or 1,6-hexanediol, condensates of ω-hydroxycarboxylic acids, for example ω-hydroxycaproic acid, and preferably polymerization products of lactones, for example unsubstituted or substituted ω-caprolactone, are also suitable.

Preferably used polyesterdiols are ethanediol polyadipates, 1,4-butanediol polyadipates, ethanediol 1,4-butanediol polyadipates, 1,6-hexanediol neopentylglycol polyadipates, 1,6-hexanediol 1,4-butanediol polyadipates and polycaprolactones.

As a rule, the polyesterdiols have molecular weights of from 500 to 6,000, preferably from 800 to 3,500.

c) Preferred chain extenders having molecular weights of in general from 60 to 400, preferably from 60 to 300, are aliphatic diols of 2 to 12, preferably 2, 4 or 6, carbon atoms, eg. ethanediol, 1,6-hexanediol, diethylene glycol, dipropylene glycol and in particular 1,4-butanediol. However, diesters of terephthalic acid with glycols of 2 to 4 carbon atoms, eg. bis(ethylene glycol, or bis(1,4-butanediol) terephthalate, and hydroxyalkylene ethers of hydroquinone, eg. 1,4-di-(β-hydroxyethyl)-hydroquinone, and polytetramethylene glycols having molecular weights of from 162 to 378 are also suitable.

In order to obtain the required hardness and melt flow index of the TPUs, the amounts of components (b) and (c) used can be varied within relatively wide molar ratios, the hardness and the melt viscosity increasing with increasing content of chain extenders (c), while the melt flow index decreases.

For the preparation of more flexible TPUs, for example those having a Shore A hardness of less than 95, in particular from 95 to 75, Shore A, the essentially difunctional polyhydroxy compounds (b) and diols (c) can be used, for example, advantageously in molar ratios of from 1:1 to 1:5, preferably from 1:1.5 to 1:4.5, so that the resulting mixtures of (b) and (c) have a hydroxyl equivalent weight of more than 200, in particular from 230 to 450, whereas for the preparation of more rigid TPUs, for example those having a Shore A hardness of more than 98, preferably 55 to 75 Shore D, the molar ratios of (b) to (c) are from 1:1.5 to 1:15, preferably from 1:6 to 1:12, so that the resulting mixtures (b) and (c) have a hydroxyl equivalent weight of from 110 to 200, preferably from 120 to 180.

d) According to the invention, organic phosphates and/or organic phosphonates are used as flameproofing agents.

The organic phosphates are the esters, in particular triesters, of phosphoric acid, such as trialkyl phosphates and in particular triaryl phosphates, for example triphenyl phosphate. According to the invention, preferably used flameproofing agents for the TPUs are phosphoric esters of the general formula (I)

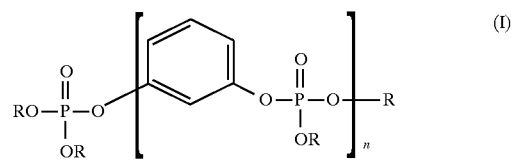

where R is an unsubstituted or substituted alkyl, cycloalkyl or phenyl group and n is from 1 to 15.

If, in the general formula (I), R is alkyl, particularly suitable alkyl radicals are those of 1 to 8 carbon atoms. An example of cycloalkyl is cyclohexyl. Preferably used phosphoric esters of the general formula (I) are those in which R is phenyl or alkyl-substituted phenyl. In the general formula (I), n is in particular 1 or preferably from about 3 to 6. Examples of the preferred phosphoric esters of the general formula (I) are 1,3-phenylene bis(diphenyl)phosphate, 1,3-phenylene bis(dixylenyl)phosphate and the corresponding oligomeric products having an average degree of oligomerization n of from 2 to 6.

The organic phosphonates are the esters of phosphonic acid, in particular diesters of alkyl- or phenylphosphonic acids. Examples of the phosphonic esters to be used according to the invention as flameproofing agents are the phosphonates of the general formula (II)

where $R^1$ is an unsubstituted or substituted alkyl, cycloalkyl or phenyl group, it being possible for the two radicals $R^1$ furthermore to be bonded to one another to form a cyclic structure, and $R^2$ is an unsubstituted or substituted alkyl, cycloalkyl or phenyl radical.

Cyclic phosphonates, for example

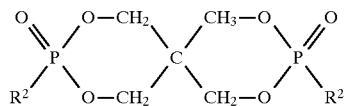

where $R^2$ is $CH_3$ or $C_6H_5$, which are derived from pentaerythritol, or

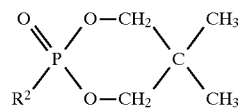

where $R^2$ is $CH_3$ or $C_6H_5$, which are derived from neopentylglycol, or

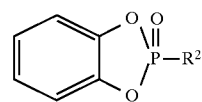

where $R^2$ is $CH_3$ or $C_6H_5$, which are derived from pyrocatechol, and

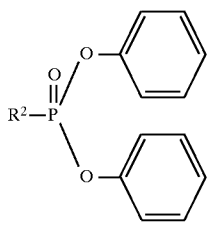

where $R^2$ is unsubstituted or substituted phenyl, are particularly suitable.

According to the invention, the phosphoric esters may be used alone or as a mixture with one another. According to the invention, phosphonic esters may likewise be used alone or as a mixture with one another. It is also possible, according to the invention, to use mixtures of one or more phosphoric esters with one or more phosphonic esters as flameproofing agents for TPU. Usually, however, phosphoric esters or phosphonic esters are used.

In a particularly advantageous and preferred embodiment of the invention, the phosphoric esters and/or phosphonic esters may be used as a mixture together with one or more melamine derivatives as flameproofing agents for the TPUs, in which the weight ratio of phosphate and/or phosphonate to melamine derivative is preferably from 5:1 to 1:5.

Preferred melamine derivatives are melamine cyanurate, melamine phosphate and melamine borate, particularly preferably melamine cyanurate. The suitable melamine derivatives may be used in commercial form. Compounds where 90% of the particles are smaller than 10 μm are advantageously used.

e) Suitable catalysts for the preparation of the TPUs, which accelerate in particular the reaction between the NCO groups of the diisocyanates (a) and the hydroxyl groups of the components (b) and (c), are the prior art catalysts, such as tertiary amines, eg. triethylamine, dimethylcyclohexylamine, N-methylmorpholine, N,N'-dimethylpiperazine, diazabicyclo[2.2.2]octane and similar compounds, and in particular organometallic compounds, such as titanic esters, iron compounds, tin compounds, eg. tin diacetate, tin dioctoate, tin dilaurate or the dialkyltin salts of aliphatic carboxylic acids, such as dibutyltin diacetate, dibutyltin dilaurate or the like. The catalysts are usually used in amounts of from 0.001 to 0.1 part by weight per 100 parts by weight of the mixture of polyhydroxy compound (b) and chain extender (c).

f) In addition, further assistants and/or additives may be added to the components in the preparation of the TPU. Examples are lubricants, inhibitors, hydrolysis stabilizers, light stabilizers, heat stabilizers, stabilizers to prevent discoloration, dyes, pigments, inorganic and/or organic fillers and reinforcing agents.

For this purpose, these assistants and/or additives can be incorporated into the components or into the reaction mixture for the preparation of the TPU. In another process variant, these assistants and/or additives (f) can be mixed with the TPU and then melted, or they are incorporated directly into the melt.

The assistants or additives which may be used are described in the technical literature, for example the monograph by J. H. Saunders and K. C. Frisch, High Polymers, Volume XVI, Polyurethane, Parts 1 and 2 (Interscience Publishers 1962 and 1964), Kunststoff-Handbuch, Volume 7, Polyurethane 1st and 2nd Editions (Carl Hanser Verlag, 1966 and 1983) or DE-A 29 01 774.

For the preparation of the novel TPUs, the components (a), (b) and, if required, (c) are reacted in the presence of the novel flameproofing agents (d) and of catalysts (e) and, if required, assistants and/or additives (f) in amounts such that the ratio of the number of equivalents of NCO groups of the diisocyanate (a) to the sum of the hydroxyl groups of components (b) and (c) is from 0.95:1 to 1.10:1. preferably from 0.98:1 to 1.08:1, in particular from about 1.0:1 to 1.05:1.

Self-extinguishing TPUs preferably prepared, according to the invention, are those in which the TPU has an average molecular weight of at least 100,000, preferably at least 400,000, in particular greater than 600,000. The upper limit for the molecular weight of the TPUs is determined, as a rule, by the processibility as well as the desired property spectrum. According to the invention, the average molecular weight of the TPUs is usually not more than about 800,000. The average molecular weights stated above for the TPU and for the components (a) and (b) are the weight averages determined by gel permeation chromatography.

According to the invention, flameproofed TPUs based on polyesters, ie. based on thermoplastically processible polyadducts of the diisocyanates (a), relatively high molecular weight polyesterols (b) and chain extenders (c) described above, have proven particularly advantageous.

The novel self-extinguishing TPUs usually contain from about 35 to 80, in particular from 50 to 75, % by weight of TPU and, as flameproofing agents, from 3 to 15, preferably from 5 to 12, % by weight of the organic phosphates and/or organic phosphonates and, if required, from 0 to 50% by weight of melamine derivatives, the percentages in each case being based on the mixture of TPU and flameproofing agents. If melamine derivatives are concomitantly used for the novel flameproofing of the TPUs, they are employed, as a rule, in amounts of at least 10, preferably from 20 to 35, % by weight, based on the mixture of TPU and flameproofing agents.

Further assistants and/or additives (f) which may be present in the novel self-extinguishing TPUs in addition to the flameproofing agents are used in the effective amounts customary for these substances.

The novel TPU molding materials are self-extinguishing, do not drip, or do not drip flaming particles, and have good mechanical and processing properties.

The Examples which follow illustrate the invention. The flameproofing agents used in each case, the amounts in which they are used and the properties of the TPUs prepared are shown in the Table.

COMPARATIVE EXAMPLE

A TPU molding was produced from polyoxytetramethylene glycol (PTHF) having a weight average molecular weight of 1,000, 4,4'-diphenylmethane diisocyanate and butane-1,4-diol at about 180° C. by the belt method with a hardness of Shore A 85 without the use of flameproofing agents, and its properties were determined.

EXAMPLES 1–7

TPU was prepared as described in the Comparative Example but, as shown in the Table, melamine cyanurate, 1,3-phenylene tetraxylenyl phosphate (product 1), 1,3-phenylene tetraphenyl phosphate (product 2) or 1,3- phenylene tetraphenyl phosphate oligomer (average degree of oligomerization n=3) (product 3) were used as flameproofing agents. The percentages by weight shown in the Table are based on the total mixture.

TABLE

| Example | Melamine cyanurate (% by wt.) | Product 1 (% by wt.) | Product 2 (% by wt.) | Product 3 (% by wt.) | TS (mm³) | Abrasion | Burns |
|---|---|---|---|---|---|---|---|
| 1 | 25.00 | 4.00 | — | — | 25 | 53 | V0 |
| 2 | 25.00 | 4.75 | — | — | 26 | 51 | V0 |
| 3 | 25.00 | 5.00 | — | — | 30 | 48 | V0 |
| 4 | 25.00 | 6.00 | — | — | 26 | 73 | V1 |
| 5 | 25.00 | 10.00 | — | — | 18 | — | Satisfactory* |
| 6 | 25.00 | — | 7.50 | — | 35 | 40 | V0 |
| 7 | 25.00 | — | — | 7.50 | 35 | 34 | Satisfactory* |
| Comp. Expl. | — | — | — | — | 50 | 35 | Not |

Abrasion: According to DIN 53,516
TS: Tensile strength in N/mm³
Flammability test UL94V according to Underwriters Laboratories UL94 Flammability Test:
V0 = Very good
V1 = Good
Not = Not classified
*Satisfactory: Sample was tested in manual flammability test and showed behavior corresponding to V0–V1.

The novel TPUs all showed good behavior in the flammability test and satisfactory mechanical properties.

We claim:

1. A self-extinguishing thermoplastic polyurethane, comprising a halogen-free flameproofing agent comprising a mixture of a) at least one compound selected from the group consisting of organic phosphates, organic phosphonates, and mixtures thereof, said phosphonates having the general formula:

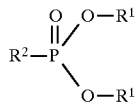

wherein each $R^1$ is independently an unsubstituted or substituted alkyl, cycloalkyl, or phenyl group or wherein the two radicals $R^1$ are bonded to one another to form a cyclic structure, and further wherein $R^2$ is an unsubstituted or substituted alkyl, cycloalkyl, or phenyl radical; and b) melamine cyanurate.

2. A self-extinguishing thermoplastic polyurethane according to claim 1, wherein component (a) comprises at least one organic phosphate of the formula:

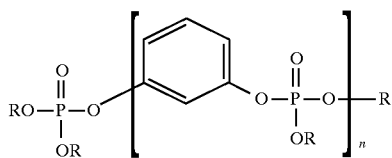

wherein each $R^3$ is independently an unsubstituted or substituted alkyl, cycloalkyl, or phenyl group and further wherein n is from about 1 to about 15.

3. A self-extinguishing thermoplastic polyurethane according to claim 2, wherein n is about 1.

4. A self-extinguishing thermoplastic polyurethane according to claim 2, wherein n is from about 3 to about 6.

5. A self-extinguishing thermoplastic polyurethane according to claim 2, wherein each $R^3$ is phenyl or alkyl-substituted phenyl.

6. A self-extinguishing thermoplastic polyurethane according to claim 1, wherein component (a) comprises at least one organic phosphonate.

7. A self-extinguishing thermoplastic polyurethane according to claim 1, wherein the component (b) comprises a melamine cyanurate having at least about 90% of the particles smaller than about 10 microns.

8. A self-extinguishing thermoplastic polyurethane according to claim 5, wherein the component (b) comprises a melamine cyanurate having at least about 90% of the particles smaller than about 10 microns.

9. A self-extingushing thermoplastic polyurethane according to claim 1, comprising from about 35 to about 80 percent by weight of the thermoplastic polyurethane, from about 3 to about 15 percent by weight of the component (a), and up to about 50 percent by weight of the component (b), the percentages in each case being based on the mixture of thermoplastic polyurethane and flameproofing agents.

10. A self-extinguishing thermoplastic polyurethane according to claim 1, comprising from about 50 to about 75 percent by weight of the thermoplastic polyurethane, from about 5 to about 12 percent by weight of the component (a), and from about 10 to about 40 percent by weight of the component (b), the percentages in each case being based on the mixture of thermoplastic polyurethane and flameproofing agents.

11. A self-extinguishing thermoplastic polyurethane according to claim 1, wherein said thermoplastic polyurethane has a weight average molecular weight of at least about 100,000.

12. A self-extinguishing thermoplastic polyurethane according to claim 1, wherein said thermoplastic polyurethane has a weight average molecular weight of at least about 400,000.

13. A self-extinguishing thermoplastic polyurethane according to claim 1, comprising from about 20 to about 35 percent by weight of the component (b) based on the mixture of thermoplastic polyurethane and flameproofing agents.

14. A process for the preparation of a self-extinguishing thermoplastic polyurethane according to claim 1, comprising a step of reacting one or more organic or modified organic diisocyanates with a polyhydroxyl component and, optionally, a chain extender component in the presence of at least one compound of component (a) and at least one catalyst.

15. A process according to claim 14, wherein the polyhydroxyl component comprises a polyesterdiol.

16. A process according to claim 14, wherein the polyhydroxyl component comprises a compound having a molecular weight of from about 500 to about 8000.

* * * * *